United States Patent [19]

Broadway et al.

[11] 3,927,358

[45] Dec. 16, 1975

[54] ELECTRIC MOTORS

[75] Inventors: Alexander Richard William Broadway; William Fong; Gordon Hindle Rawcliffe, all of Bristol, England

[73] Assignee: National Research Development Corporation, London, England

[22] Filed: Apr. 1, 1974

[21] Appl. No.: 456,857

[30] Foreign Application Priority Data

Apr. 13, 1973  United Kingdom............... 17943/73

[52] U.S. Cl................................. 318/224; 310/207
[51] Int. Cl.[2]....................................... H02K 17/14
[58] Field of Search........... 310/179, 180, 184, 198, 310/201, 202, 203, 204, 205, 206, 207, 208; 318/224

[56] References Cited
UNITED STATES PATENTS

| | | | |
|---|---|---|---|
| 3,197,686 | 7/1965 | Rawcliffe | 318/224 |
| 3,308,363 | 3/1967 | Rawcliffe | 318/224 |
| 3,619,748 | 11/1971 | Eastham | 318/224 |
| 3,673,477 | 6/1972 | Broadway | 318/224 |
| 3,686,553 | 8/1972 | Broadway | 318/224 |
| 3,794,870 | 2/1974 | Broadway | 310/180 |

*Primary Examiner*—R. Skudy
*Attorney, Agent, or Firm*—Larson, Taylor and Hinds

[57] ABSTRACT

A 3-phase, alternating current, speed-changing electric motor or generator with speed-changing effected by pole-amplitude modification. The machine has a winding layout providing a first pole-number. The second pole-number requires the reversal in polarity of all poles in each negative half wave of a sinusoidal pole-amplitude modulation wave extending the 360° of the winding periphery. Pole-amplitudes, determined by coil-grouping, approximate to the sinusoidal amplitude of the modulation wave at the pole-locations. Pole-locations are substantially equally spaced-apart throughout, but coil-groups at the zero-amplitude positions of the modulation wave may be omitted (so-called "phantom" coil-groups). Integral coil-group values approximating closely to the sine wave amplitude values at the corresponding pole-locations, are used.

13 Claims, 6 Drawing Figures

COIL-PITCH: 6 SLOTS (1-7 etc.)

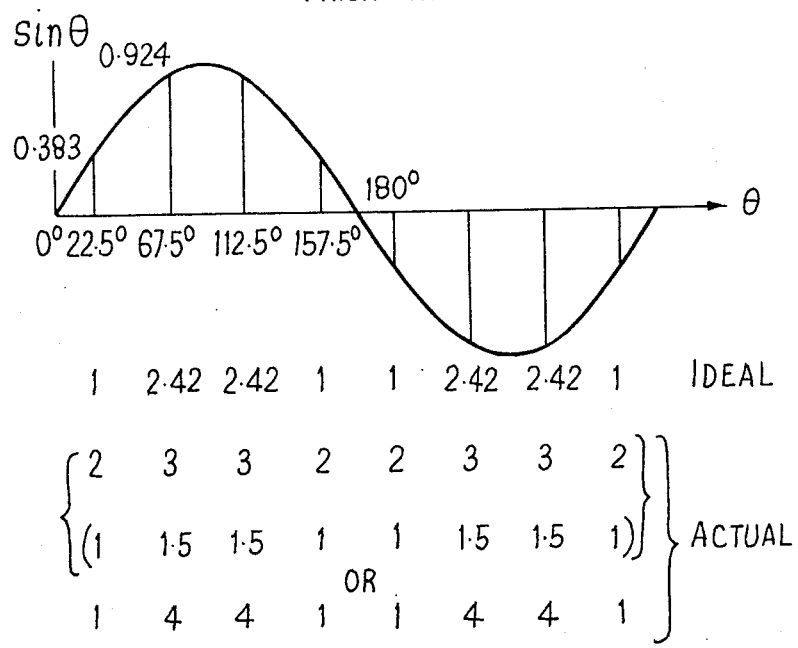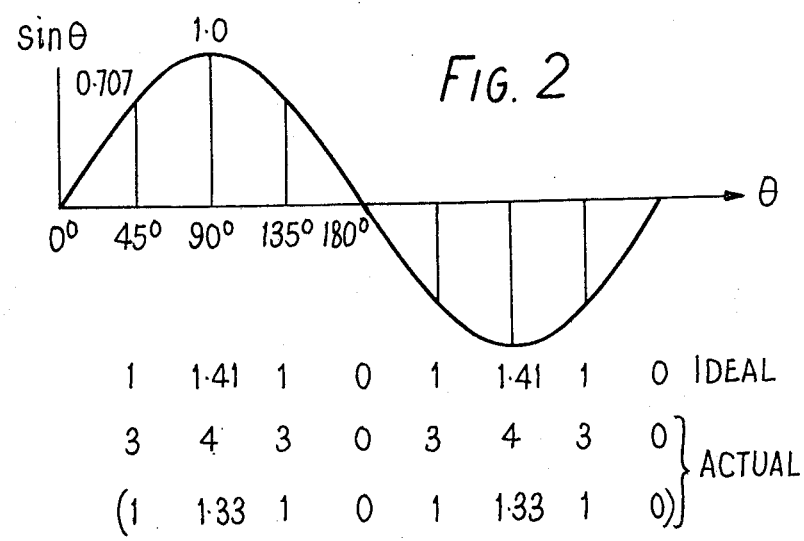

Coil-pitch: 6 slots (1-7 etc.)

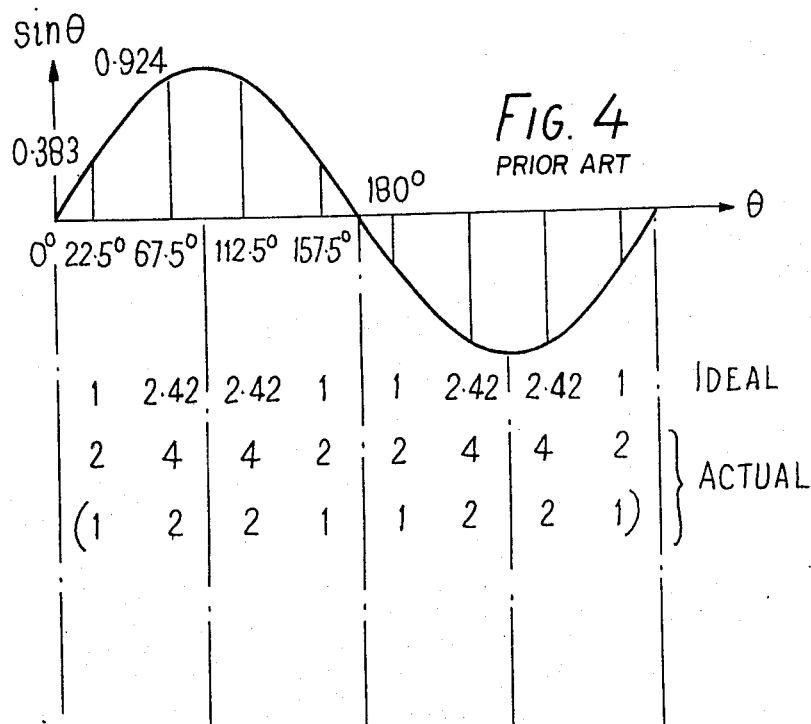
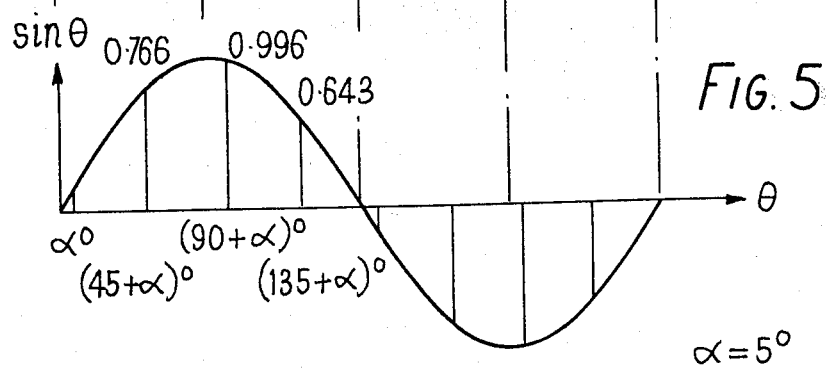

Coil-pitch: 7 slots (1-8 etc.)

ELECTRIC MOTORS

This invention relates to 3-phase, alternating-current, speed-changing electric motors and generators, in which speed-changing is effected by the method of pole-amplitude modulation, (PAM).

The method of providing alternative operating pole-numbers by pole-amplitude modulation has been described in papers by Professor G. H. Rawcliffe and others, the first entitled "Induction Motor Speed-Changing by Pole-Amplitude Modulation" in the Proceedings of The Institution of Electrical Engineers, Vol. 105, Part A, No. 22, August 1958 and a second entitled "Speed-Changing Induction Motors — Further Developments in Pole-Amplitude Modulation" in the Proceedings of the Institution of Electrical Engineers, Vol. 107, Part A, No. 36, December 1960.

The method has been further described and defined in U.S. Pat. Nos. 3,233,159, 3,070,734, 3,175,142, 3,175,143, 3,175,144 3,197,686, 3,299,337, 3,308,363, 3,673,477, 3,686,553 and others.

The object of the present invention is to provide further improved electric machines of the said type in which speed-changing is effected by pole-amplitude modulation.

U.S. Pat. No. 3,233,159 disclosed "symmetrical" PAM windings, wherein two pole-numbers are provided, neither pole-number being a multiple of "3". The stator windings described are identical for each phase and there is consequently no possibility of unbalance arising therein for either pole-number.

Such windings described in U.S. Pat. No. 3,233,159 are of two types:

The first type is based on a winding which is initially uniformly distributed and from which, on modulation, certain coils (at regular intervals) are excluded. The circuit used for this purpose is shown in FIGS. 11(a) and 11(b) of that specification. This type of winding and switching is now rarely used, and will not be considered any further herein.

The second type uses phase-windings all coils of which are energized at both running speeds. The circuit used for this purpose is shown in FIGS. 12(a) and 12(b) of that patent.

The object of the present invention is more particularly to provide improved electric machines using the second type of winding considered in U.S. Pat. No. 3,233,159.

Accordingly, the present invention provides a three-phase alternating-current, speed-changing rotary machine, comprising an electric motor or generator, having a stator winding comprising three phase-windings wound on a stator frame in a layout defining a first operating pole-number, speed-changing to a second operating pole-number being effected by the method of pole-amplitude modulation, said layout defining a pole-amplitude modulation wave extending around each phase-winding circumference, the poles in alternate half-cycles of the said wave being reversed in polarity to provide the said second operating pole-number, the phase-winding coil-group distribution providing the poles of the said first pole-number comprising substantially equi-angularly spaced-apart coil-groups of sequentially varying amplitude approximating to a sinusoidal amplitude distribution within each modulating wave half-cycle, the said distribution including coil-group locations, angularly spaced-apart from adjacent coil-group as aforesaid, comprising zero-number coil groups positioned substantially at the zero-amplitude positions defined by the said sinusoidal amplitude distribution of the said modulating wave.

In order that the invention may readily be carried into practice, two embodiments, both showing the principle of the invention applied to an 8-pole/10-pole machine, both with an 8-pole winding layout, will now be described in detail, by way of example, with reference to the accompanying drawings in which:

FIG. 1 is a diagram showing coil-grouping of an 8-pole/10-pole winding in 60 slots constructed according U.S. Pat. No. 3,233,159;

FIG. 2 is a similar diagram showing coil-grouping of an 8-pole/10-pole winding in 60 slots, according to the present invention;

Figure 6:
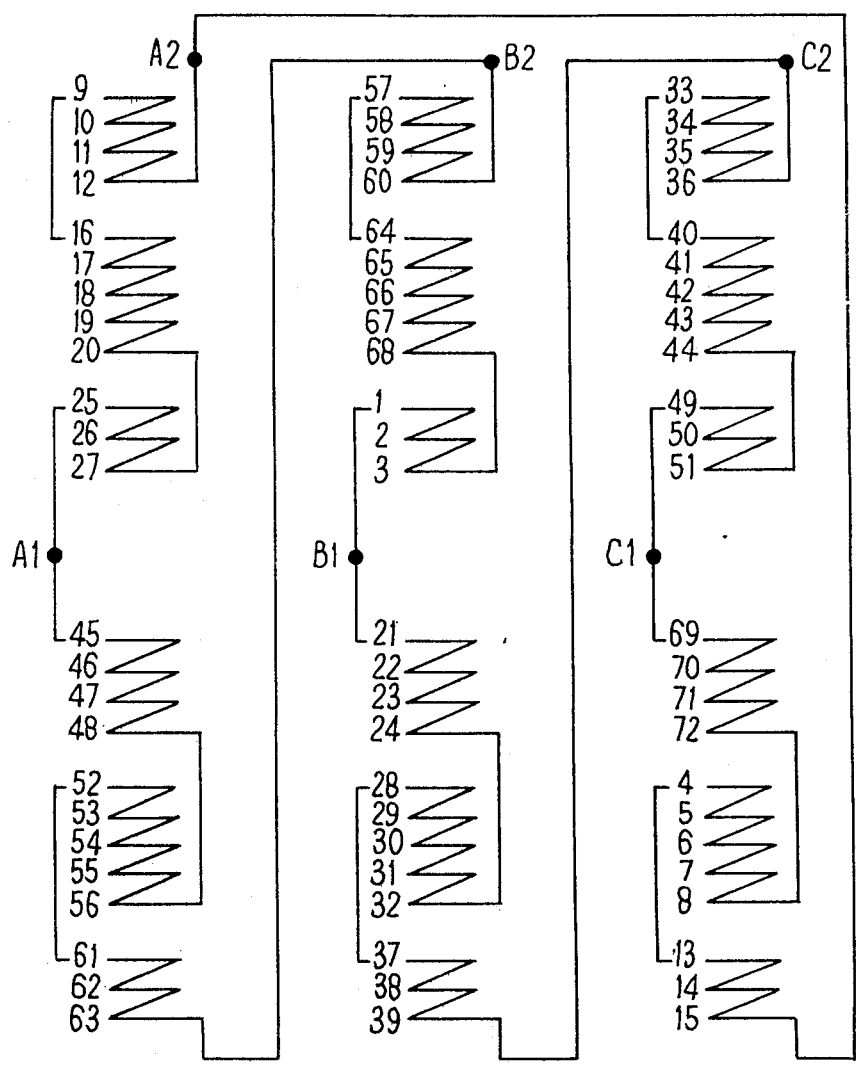

FIG. 4 is a diagram showing coil-grouping of an 8-pole/10-pole winding in 72 slots constructed according U.S. Pat. No. 3,233,159;

FIG. 5 is a similar diagram showing coil-grouping of an 8-pole/10-pole winding in 72 slots, according to the present invention: and FIG. 6 is a winding diagram of an 8-pole/10-pole winding in 72 slots, according to the present invention;

In U.S. Pat. No. 3,233,159, it was assumed that the coil-grouping of each phasewinding was symmetrical, within each 180° of the pole-amplitude modulating wave for the phase-winding, about the mid-point of that wave. This assumption placed some severe limitations on the coil-grouping and on the properties of the winding.

For example, a 60-slot 8-pole/10-pole P.A.M. winding, could be grouped 2-3-3-2-2-3-3-2 per phase, or 1-4-4-1 --1-4-4-1,. The grouping 2-3-3-2is, in ratio, proportional to 1-1.5-1.5-1.

FIGS. 1 and 2 and FIGS. 4 and 5 of the drawings are diagrams representing one phase-winding of a 3-phase machine and showing a single-cycle, sinusoidal pole-amplitude wave extending the periphery of that phase winding. Vertical lines representing the ideal locations of the coil-groups, according to the 8-pole layout, are spaced apart 360/N°, that is 45°. The angular position of the coil-group locations within the sinusoidal modulating wave may vary, as it is now recognised according to the principle of the present invention, although the ideal angular spacing between the coil-groups remains unchanged.

The height of the lines varies sequentially according to the sinusoidal wave. The "ideal" values according to the sinusoidal wave drawn, and according to the chosen angular positions of the coil-groups within the sinusoidal wave, is shown by the first line of numbers below. The "actual" values, according to the practical coil-grouping described, is shown in the second and subsequent lines.

FIG. 1 shows an arrangement, as described in U.S. Pat. No. 3,233,159, in which the coil-groups locations (8-poles) are spaced apart by 45° and arranged, within the half-cycles of the modulation wave, symmetrically about the zero-crossing of the sinusoidal curve at 180°.

The ideal coil-grouping to provide a sinusoidal pole-amplitude distribution, for the symmetrical pole-locations shown, would be 1-2.42 - 2.42 - 1 and repeat. The practical coil-distributions given, corresponding to either "1.5" or "4.0" are each far removed from the ideal value of "2.42".

It has now been realised that it is possible to locate a phantom coil-group at each coil-group location which coincides with or is near to a zero-amplitude position according to the sinusoidal pole-amplitude modulation wave. Furthermore, it is permissible relatively to displace the modulation sine curve and the coil-group locations so as to make a coil-group location coincide substantially with a zero-amplitude position of the sine curve.

By a "phantom" coil-group is meant a zero-number of coils, at a coil-group location. In other words, such coil-groups are omitted by there being no coils wound at such locations. By "substantially" at a zero-amplitude position is meant at an angular position for which the sine value is low and "zero" is a near approximation. "Substantially " certainly includes an angular displacement of 5°, as in the example of FIG. 5.

Such an arrangement is shown in FIG. 2, from which diagram it is clear that the actual coil-grouping (3-4-3-0--3-4-3-0, proportional to 1-1.33-1-0 and repeat) and the ideal coil-grouping (1-1.41-1-0 and repeat) are very nearly the same.

This coil grouping means that the design approaches more nearly to the ideal and that the m.m.f. harmonic content is much reduced. Also, there is the added practical advantage that this 8-pole/10-pole P.A.M. winding contains only 18 coil-groups in all, that is 6 per phase not 8 per phase. Manufacture and the making of end-connections is thereby simplified.

Figure 3:
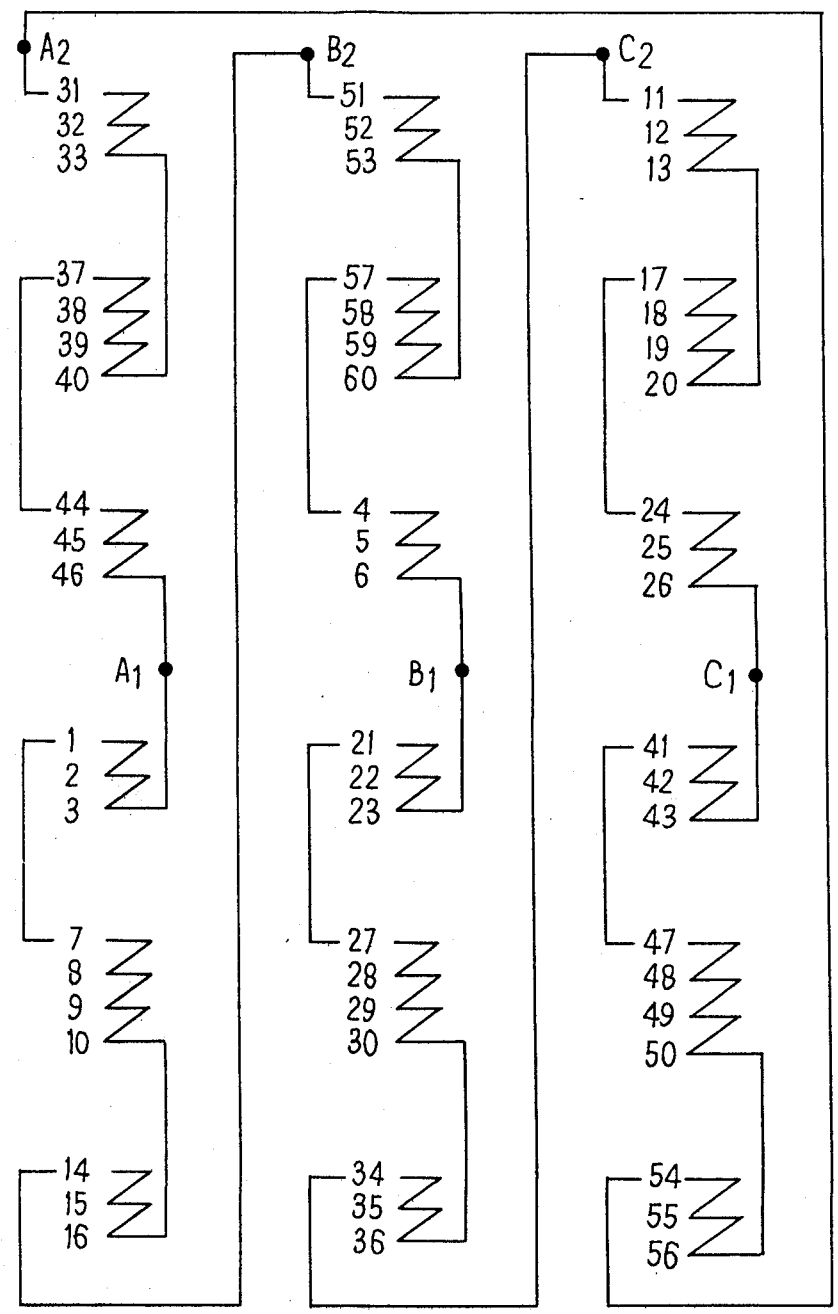
FIG. 3 is a winding diagram of an 8-pole/10-pole winding in 60 slots, according to the present invention.

A winding diagram for a 60-slot, 8-pole/10-pole winding, having such coil-grouping, is given in FIG. 3. The coil-pitch is 6 slots throughout, that is slot 1 to slot 7 and so on.

There is the further advantage, which applies generally to such windings, that the layer factors are nearly equal ($l_8 = 0.874$ and $l_{10} = 0.862$) and the air-gap flux-density ratio therefore is 0.958. This compares very favourably with the value 0.78 for the earlier form of 8-pole/10-pole, 60-slot P.A.M. winding of FIG. 1. The lower value of $[B_8/B_{10}]$ of the winding of FIG. 1 means that the rating of the motor is lower at the higher speed, whereas in fact it normally needs then to be greater.

The coil-grouping shown in FIG. 2 still possesses some degree of spatial symmetry, in that the coils are still grouped symmetrically about the phantom coil-group at the 180° coil-group location.

A further principle of the present invention is that the coil-group locations and the sinusoidal modulating wave may be relatively displaced, to enable coil-group locations to coincide substantially with zero-positions of the sinusoidal modulating wave, that is, correspond to low-value amplitude positions of the said wave, representing values of, say, less than 10% of the peak amplitude, without the requirement for the coil-group locations to be symmetrically disposed about the 180° point of the sine wave.

Considering, as a further example, an 8-pole/10-pole P.A.M. winding in 72 slots. According to the known principles of U.S. Pat. No. 3,233,159, this would be grouped 2-4-4-2--2-4-4-2, which is proportional to 1-2-2-1 and repeat, as shown in FIG. 4. In this case, the value "2.0" is already a better approximation of the ideal value of "2.42" than were the corresponding values for the 60-slot winding. However, the present invention provides a new and better way of winding an 8-pole/10-pole P.A.M. winding in 72 slots, now to be discussed.

It is possible to group the coils in a completely skewed manner over each 180° of modulating wave. The number of coils per group can then be made proportional to $\sin \alpha$, $\sin (45 + \alpha)$, $\sin (90 + \alpha)$ and $\sin (135 + \alpha)$, if this gives a still closer approximation. By drawing up a simple table of these values for a small range of values of the angular displacement $\alpha$, it becomes clear that a value of $\alpha = 5°$ gives relative values for the coil-grouping which are very near to 0-4-5-3 --0-4-5-3.

As shown in FIG. 5, the numerical values for $\alpha = 5°$ are proportional to 0.44-3. 83-5-3.22.

As shown by the actual figures in the lowest line of FIG. 5, the zero-number coil-groups are placed at coil-group locations substantially at the zero-value positions of the sinusoidal modulation curve and are here located at positions where the numerical values are 0.44, relative to a maximum amplitude of 5.0. "Substantially" at the zero-value positions, in this case, means at angular positions displaced by 5° from the zero-value positions. The other three coil-group locations in each wave half-cycle are each represented by a different coil-grouping, the values being "4", "5" and "3" coils per group respectively.

This retains the practical advantage of having only 18 coil-groups in the complete winding. Further, the layer factors are $l_8 = 0.863$; $l_{10} = 0.856$, and the air-gap flux-density ratio is $B_8/B_{10} = 0.97$. This last value is much more satisfactory than the value 0.855 which is obtained with a motor designed according to FIG. 4.

A winding diagram of an 8-pole/10-pole P.A.M. winding in 72 slots is shown in FIG. 6. The extreme simplicity of the winding will be clear from the winding diagram, and the excellent winding data obtained. The m.m.f. analysis. for both pole-numbers, for the windings in both FIG. 3 and FIG. 6 has been carried out and the results are very satisfactory.

The principles of the present invention are applicable not solely to 8-pole/10-pole machines, but generally to machines where neither pole-number is a multiple of "3" and where the three phase-windings are identical.

The principle is considered to be particularly valuable for a 14-pole/16-pole machine and for multiples of the 8-pole/10-pole winding, for example a 16-pole/20pole winding. In each case, the first pole-number defines the winding layout.

What we claim is:

1. A three-phase alternating current, speed-changing rotary machine, comprising an electric motor or generator, wherein speed-changing from a first operating pole-number to a second operating pole-number is effected by the method of pole amplitude modulation, said machine having a stator winding comprising three phase-windings wound on a stator frame in a layout defining said first operating pole-number, said layout defining a pole-amplitude modulation wave extending around the circumference of each phase-winding wherein the poles in alternate half-cycles of the said wave are reversed in polarity to provide the said second operating pole-number, the phase-winding coil-group distribution providing the poles of the said first pole-number comprising substantially equi-angularly spaced-apart coil-groups of sequentially varying amplitude which approximates a sinusoidal amplitude distribution within each modulating wave half-cycle, the said distribution including coil-group locations, substantially equi-angularly spaced-apart from adjacent coil-groups comprising zero-number coil groups positioned substantially at the zero-amplitude positions defined by the said sinusoidal amplitude distribution of the said modulating wave.

2. A three-phase alternating-current, speed-changing machine as claimed in claim 1, having coil-group locations symmetrically disposed about the .180° point of the sinusoidal modulation wave.

3. A three-phase alternating-current, speed-changing machine as claimed in claim 1, having coil-group locations which are not symmetrically disposed about the 180° point of the sinusoidal modulation wave.

4. A three-phase alternating-current, speed-changing machine as claimed in claim 2, having a first pole-number devisable by "4", having a coil-group locating with the highest coil-grouping located at each unit value amplitude position of the sinusoidal modulation wave and omitted coil-groups at each zero-amplitude position of the said wave.

5. A three-phase alternating-current, speed-changing machine as claimed in claim 4, for 8-pole/10-pole working, having coil-group locations with coil-groupings equal to each other but fewer than at the said unit value amplitude position pole-locations, positioned at 45°, 135°, 225°, and 315° of the sinusoidal modulation wave.

6. A three-phase alternating current, speed-changing machine as claimed in claim 3, in which some of the coil-group locations coincide exactly with zero-value amplitude positions of the sinusoidal modulation wave and the zero-number coil-group locations correspond to low-value amplitude positions of the said wave.

7. A three-phase alternating-current, speed-changing machine as claimed in claim 6, for 8-pole/10-pole working, having zero-number coil-group locations at positions of the sinusoidal modulation wave displaced by only a small angle from a position of zero-amplitude value and three equi-angularly spaced apart coil-group locations therebetween each one having a different coil-grouping from the other two.

8. A three-phase alternating-current, speed-changing machine as claimed in claim 3 in which some of the coil group locations coincide exactly with unit value amplitude positions of the sinusoidal modulation wave and the zero-numbr coil-group locations correspond to low-value amplitude positions of the said wave.

9. A three-phase alternating current, pole-amplitude modulation speed-changing rotary machine, comprising an electric motor or generator, said machine having a slotted stator carrying a stator winding comprising three phase-windings each with substantially equiangularly spaced-apart coil-group locations, consecutive coil-group locations comprising different numbers of coils, the numbers of coils grouped at the said coil-group locations varying substantially in accordance with a sinusoidal distributionn extending around the entire periphery of the phase-winding concerned, coil-groups being entirely omitted from coil-group locations corresponding substantially to zero values of said sinusoidal amplitude distribution, and all the slots of the said slotted stator being occupied by coils grouped at others of the said coil-group locations.

10. A three-phase alternating-current, speed-changing machine as claimed in claim 9, in which coil-groups comprising the largest of said different numbers of coils are positioned at coil-group locations corresponding substantially to maximum values of said sinusoidal amplitude distribution.

11. A three-phase alternating-current, speed-changing machine as claimed in claim 10, having coil-group locations symmetrically disposed about the middle (180°) point of the sinusoidal amplitude wave extending around the periphery of the phase-winding concerned.

12. A three-phase alternating-current, speed-changing machine as claimed in claim 11, for 8 pole/10 pole working having pole locations corresponding to the 45°, 135°, 225°, and 315° points of the said sinusoidal amplitude wave occupied by groups of coils of equal number to each other but fewer than the said largest number.

13. A three-phase alternating current, speed-changing machine as claimed in claim 10, having coil-group locations asymmetrically disposed with respect to the middle (180°) point of the sinusoidal amplitude wave extending around the periphery of the phase-winding concerned, coil-group locations being positioned at corresponding angular positions of the first and second halves of the said sinusoidal wave and each such coil-group location being occupied by a coil-group of a different number of coils from the coil-groups of the same half of the sinusoidal wave and the same number of coils of the correspondingly positioned coil-group of the other half of the sinusoidal wave.

* * * * *

UNITED STATES PATENT OFFICE
CERTIFICATE OF CORRECTION

PATENT NO. : 3,927,358
DATED : December 16, 1975
INVENTOR(S) : Alexander Richard William Broadway et al.

It is certified that error appears in the above-identified patent and that said Letters Patent are hereby corrected as shown below:

On the cover page, line 11, under the priority date now appearing, please insert the following:

July 12, 1973     United Kingdom     33273/73

Signed and Sealed this

Fourth Day of January 1977

[SEAL]

Attest:

RUTH C. MASON
*Attesting Officer*

C. MARSHALL DANN
*Commissioner of Patents and Trademarks*